United States Patent
Silk et al.

(10) Patent No.: US 8,530,777 B2
(45) Date of Patent: Sep. 10, 2013

(54) WELDING PURGE CONTROL USING ELECTRONIC FLOW CONTROL

(75) Inventors: Kevin Silk, Stow, OH (US); Richard A. Ales, Solon, OH (US); William Ponikvar, Sagamore Hills, OH (US); Michael Mussig, Painesville, OH (US); David N. Stafford, Aurora, OH (US)

(73) Assignee: Swagelok Company, Solon, OH (US)

( * ) Notice: Subject to any disclaimer, the term of this patent is extended or adjusted under 35 U.S.C. 154(b) by 1145 days.

(21) Appl. No.: 12/445,586

(22) PCT Filed: Oct. 19, 2007

(86) PCT No.: PCT/US2007/081903
§ 371 (c)(1),
(2), (4) Date: Apr. 15, 2009

(87) PCT Pub. No.: WO2008/051829
PCT Pub. Date: May 2, 2008

(65) Prior Publication Data
US 2010/0012625 A1 Jan. 21, 2010

Related U.S. Application Data

(60) Provisional application No. 60/862,233, filed on Oct. 20, 2006.

(51) Int. Cl.
*B23K 9/16* (2006.01)
(52) U.S. Cl.
USPC ............ 219/59.1; 219/74; 219/75; 219/60 A; 219/60 R; 219/130.1; 219/121.51

(58) Field of Classification Search
USPC .......... 219/74, 75, 60 A, 60 R, 130.1, 121.51, 219/59.1
See application file for complete search history.

(56) References Cited

U.S. PATENT DOCUMENTS

| | | | | |
|---|---|---|---|---|
| 3,536,879 A | * | 10/1970 | Sirois et al. | 219/60 A |
| 3,621,177 A | * | 11/1971 | McPherson et al. | 219/51 |
| 3,662,147 A | * | 5/1972 | Ogden et al. | 219/137.71 |
| 4,100,390 A | * | 7/1978 | Jackson | 219/74 |
| 4,121,084 A | * | 10/1978 | Wear | 219/91.2 |
| 4,278,864 A | * | 7/1981 | De Facci et al. | 219/75 |
| 4,415,114 A | * | 11/1983 | Hallenbeck | 228/57 |
| 4,845,331 A | * | 7/1989 | Yeo et al. | 219/72 |
| 4,972,866 A | * | 11/1990 | Anthony et al. | 137/110 |

(Continued)

FOREIGN PATENT DOCUMENTS

| | | |
|---|---|---|
| JP | 4-070284 | 3/1992 |
| WO | 03/082509 | 10/2003 |

OTHER PUBLICATIONS

Office action from Japanese Application No. 2009-533558 dated Sep. 13, 2012.

(Continued)

*Primary Examiner* — Joseph M Pelham
*Assistant Examiner* — Jimmy Chou
(74) *Attorney, Agent, or Firm* — Calfee, Halter & Griswold LLP

(57) ABSTRACT

Purge gas apparatus and method for a welding system uses automatic purge gas flow control function, such as an MFC, to control ID and/or OD purge gas flow rate or purge gas pressure or both at the weld site.

11 Claims, 3 Drawing Sheets

(56) References Cited

U.S. PATENT DOCUMENTS

| | | | |
|---|---|---|---|
| 5,187,343 A * | 2/1993 | Edwards | 219/74 |
| 5,299,731 A * | 4/1994 | Liyanage et al. | 228/219 |
| 5,304,776 A * | 4/1994 | Buerkel et al. | 219/125.11 |
| 5,390,846 A * | 2/1995 | Thode | 228/219 |
| 5,396,039 A * | 3/1995 | Chevrel et al. | 219/61 |
| 5,686,002 A * | 11/1997 | Flood et al. | 219/137 R |
| 5,824,983 A * | 10/1998 | Huddleston, Jr. | 219/61 |
| 5,864,111 A * | 1/1999 | Barefoot | 219/61 |
| 6,423,936 B1 * | 7/2002 | Reed | 219/130.21 |
| 6,518,534 B1 * | 2/2003 | Krishnan et al. | 219/74 |
| 6,570,132 B1 * | 5/2003 | Brunner et al. | 219/132 |
| 6,610,957 B2 * | 8/2003 | Uttrachi | 219/74 |
| 6,639,171 B2 * | 10/2003 | Tsuge | 219/56.22 |
| 6,653,596 B2 * | 11/2003 | Blankenship | 219/137 PS |
| 6,739,204 B1 * | 5/2004 | Barefoot | 73/861.32 |
| 6,852,949 B2 * | 2/2005 | Lanouette et al. | 219/130.5 |
| 6,857,447 B2 * | 2/2005 | Olander et al. | 137/240 |
| 6,882,696 B2 * | 4/2005 | Nakayama et al. | 376/327 |
| 7,026,569 B2 | 4/2006 | Halvorsen | |
| 7,057,137 B1 * | 6/2006 | McGushion | 219/125.11 |
| 7,247,814 B2 * | 7/2007 | Ott | 219/132 |

OTHER PUBLICATIONS

International Search Report from PCT/US07/81903 dated Apr. 22, 2008.

* cited by examiner

WELDING PURGE CONTROL USING ELECTRONIC FLOW CONTROL

RELATED APPLICATIONS

The present application is the U.S. national phase entry of PCT/US2007/081903, with an international filing date of Oct. 19, 2007, which claims the benefit of U.S. provisional application Ser. No. 60/862,233 filed on Oct. 20, 2006, for WELDING PURGE CONTROL USING MASS FLOW CONTROL, the entire disclosures of which are fully incorporated herein by reference in their entirety.

BACKGROUND

In arc welding, such as for example an orbital welder, a welder power supply is used that produces a low voltage high current power source to maintain a stable arc. The arc is initiated or struck by a high voltage breakdown across the gap between the electrode and the workpiece. Once the arc is struck, the voltage across the gap is much lower than the breakdown voltage and the current increases substantially. An arc start circuit may be used to strike the arc, and then the welder power supply is used during the welding operation.

One type of welder that is commonly used today is an orbital welder, in which an electrode revolves around the weld site during a welding operation. The electrode movement occurs within a weld head that generally surrounds and generally encloses the weld site. An orbital welder, for example, is commonly used for butt welding two tubes or pipes together. During some types of welding such as for example TIG welding used for stainless steel tubing, it is important to provide an inert purge gas at the weld site. The purge gas prevents oxidation and other deleterious effects during the welding operation The purge gas is provided within the tubing (ID purge) and around the outside of the tubing (OD purge).

SUMMARY

In accordance with one inventive aspect of the present disclosure, a purge system or arrangement is provided that uses an automatic flow control function, such as for example, a mass flow controller (MFC), to control the flow and/or pressure of the purge gas. In one embodiment, an automatic flow control function may be used for dynamic OD (outer diameter) purge control, in another embodiment an automatic flow control function may be used for dynamic ID (inner diameter) purge control, and in still another embodiment a first automatic flow control function may be used for dynamic ID purge control and a second automatic flow control function may be used for dynamic OD purge control.

In accordance with another inventive aspect of the disclosure, one or more automatic flow control devices, such as for example an MFC, may be used for dynamic purge control which may be incorporated into or integrated with a welder power supply. In one embodiment, MFC dynamic purge control is incorporated into a welder power supply for an orbital welding system.

In accordance with another inventive aspect of the disclosure, dynamic purge control may be used to carry out a dynamic purge sequence that includes an increased purge flow rate during a pre-weld purge operation and optionally an increased purge flow rate during a post-weld purge operation, or both a pre-weld and a post-weld high flow purge operations, wherein the pre and post weld flow rates are higher than the purge flow rate during a welding operation. In one embodiment, one or more automatic flow control devices such as MFC devices are used to control flow rate and/or pressure of the purge gas. The use of MFC type devices, for example, permits both a dynamic purge sequence as well as an automatic purge sequence. An automatic flow control function in another embodiment may be use to confirm that purging begins before a welding system is enabled for a welding operation.

In accordance with another inventive aspect of the disclosure, methods for dynamic purge control are provided, including dynamic ID purge control, dynamic OD purge control and optionally both during a welding operation. In one embodiment, an automatic flow rate control function may be used to compensate ID purge pressure variation during a welding operation.

These and other aspects and advantages of the disclosure and inventions herein will be readily understood and appreciated from a reading of the following detailed description in view of the accompanying drawings.

DETAILED DESCRIPTION OF EXEMPLARY EMBODIMENTS

Figure 1:
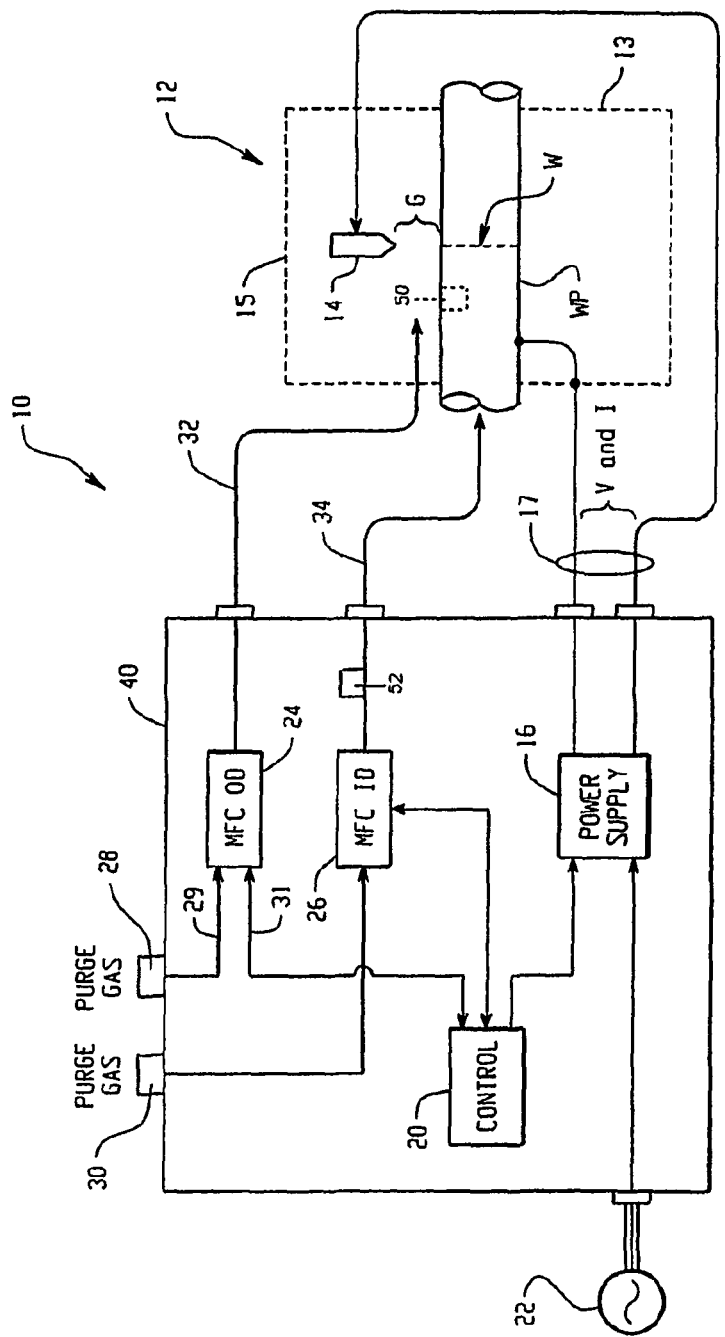
FIG. 1 is an exemplary functional block diagram of a welding system.

Although the inventive aspects and exemplary embodiments are described and illustrated herein with reference to an orbital welder and tubular workpieces, such examples are not to be construed as limiting the scope of the inventions set forth herein. Various inventions described herein will find applications beyond orbital welding or tubular workpieces. Furthermore, although a mass flow controller (MFC) is illustrated for use with the exemplary embodiments of an automatic flow control function and automatic purge control, it is well known that automatic or electronic flow control may be realized in many ways other than just an MFC, and the present disclosure is intended to cover all such alternatives, whether known or later developed.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

With reference to FIG. 1, a welding system 10 is schematically represented, and in this exemplary embodiment includes a weld head 12 having an electrode 14. The inventive aspects that are part of this disclosure may be used with many kinds of welder power supplies and weld heads, for example, a weld head such as model SWS-5H-C available from Swagelok Company, Cleveland, Ohio. The weld head 12 may be manual or automatic and typically includes or is associated with a fixture 13 that holds or positions a workpiece WP near the electrode 14 for a welding operation. For example, an orbital welder may include a weld head 15 that holds the electrode 14 (and motor to rotate the electrode) and interfaces with the fixture 13 or holder that supports two tube ends. The tube ends are typically clamped in end to end abutting engagement with the abutting ends being the weld site W proximate the electrode 14 for welding.

The welding system 10 further includes a welder power supply 16, for example, model SWS-M100-1-1 available from Swagelok Company, Cleveland, Ohio. The power supply 16 provides the appropriate voltage and current profiles to carry out each welding operation. The welder power supply 16 typically provides the power needed after the weld arc is struck, and may also include or be operable with an arc start circuit. A control system 20 carries out overall control of a welding operating including control of the power supply 16, electrode drive motor of the weld head, purge control and so on. An exemplary control system 20 may be model M100 available from Swagelok Company, Cleveland, Ohio. Any suitable control arrangement may be used for the control system 20, including but not limited to software based microprocessors or microcontrollers, PLC type systems, discrete circuits and so on to name a few examples. Functionally, the arc start circuit provides high voltage, low current power, such as a pulse, that breaks down or ionizes the gap G between the electrode 14 and the workpiece WP. Once the arc is struck, the arc start circuit may be disabled and the power supply 16 used to provide low voltage, high current power to maintain the arc during a welding operation. The supply 16 may be connected to the electrode 14 and a negative reference or ground for the workpiece using electrical cables 17.

A general power source 22, such as conventional AC wall power, is used to power the power supply 16 and the overall system 10. Some welding systems 10 may include or use a portable supply or generator for the source 22. Thus the supply 22 may be conventional 110 VAC, 220 VAC or other power input sufficient to power the system 10. The system 10 may also operate from a DC source.

In accordance with an inventive aspect of the disclosure, an automatic flow control function may be realized, for example, with one or more mass flow controllers (MFCs) or other suitable arrangement to achieve automatic flow control functionality, to effect automatic purge control. A suitable device for automatic flow control functionality is a mass flow controller such as the GFC Series, available from AALBORG, Orangeburg, N.Y. In the exemplary embodiment, a first MFC may be used for OD purge control 24 and a second MFC may be used for ID purge control 26. The OD purge control 24 receives at an inlet 29 purge gas from a first source connection 28 and the ID purge control 26 receives at an inlet 31 purge gas from a second source connection 30. Both purge controls may alternatively be connected to a common purge gas inlet. Also, in alternative embodiments a welding system 10 may only need one of the two purge controls, or may have them both present but only use one of them during a particular welding operation.

The purge gas flowing out of the OD purge control 24 flows through a connection or hose 32 to the weld head 12 so as to flow along the outside surface and surrounding volume at the weld site W. The purge gas flowing out of the ID purge control 26 flows through a connector or hose 34 to the workpiece WP so as to flow through the interior volume of the workpieces being welded together.

The use of automatic flow control functions as taught herein, such as with an MFC for example, for purge control allows for automatic purge gas flow profiles and control, in contrast to prior systems that used manual valve adjustments and flow meters. These prior systems require substantial set-up time in order to achieve the proper purge gas flow for a particular welding operation. By automatic purge control is simply meant that the purge flow profile and sequences may be carried out electronically, for example, by programming the control system 20, rather than having to manually adjust flow valves and observe flow rates on a flow meter. A separate control function may alternatively be used for automatic purge control, rather than the welder control system 20. In such an alternative embodiment, the purge control function may send a signal to the control system 20 indicating that purging has been properly initiated prior to enabling a welding operation. The term "automatic" is not intended to exclude the option of allowing an operator to input changes to the purge sequence. The term automatic purge control is intended to include the options of flow control as well as pressure control via flow control. Changing the purge gas flow profile may be necessary, for example, when a welding operation is changed. The use of an automatic purge control also facilitates use of dynamic purge sequences, meaning that the purge gas flow rate and/or pressure may be adjusted or changed over the course of a welding operation, as well as during pre-weld and post-weld purging operations.

Prior systems typically have the purge system separate from the welder and power supply so that an operator could forget to perform the purging operation. The use of automatic purge control in accordance with the inventions herein overcomes many issues with prior manual systems because the control system 20 may easily be programmed to execute various purge flow profiles before, during and after welding. The automatic purge control, for example, allows for feedback to the control system 20 so that the welding system 10 may be inhibited in the absence of adequate purging.

For OD purge, purge gas flow rate is a significant consideration. Sufficient flow must be present to prevent oxidation, but too high a flow can cause the arc to "bend" or even extinguish. The use of automatic flow control functionality allows for automatic control of the OD purge gas flow rate. The flow rate used for specific welding operations may be empirically determined.

For ID purge, in addition to flow rate it may be desirable in some cases to maintain pressure inside the workpieces particularly at the weld site. The inner pressure may be used, for example, to offset the effect of gravity on the weld puddle. Also, as a welding operation proceeds, internal pressure can build due to a decrease in purge gas "venting" through the weldment. The use of automatic flow control function allows for automated or dynamic internal pressure adjustment as a function of flow rate. The flow rate set point for achieving desired pressure within the workpieces may be empirically determined. For example, a T-connection (not shown) may be inserted at the weld site as part of a calibration procedure. A magnahelic pressure sensor (not shown) may be inserted into the T-connection to sense pressure at different flow rates from the corresponding MFC. The T-connection is then removed and the welding operations can be performed, with the control system 20 storing relationships between commanded flow rates and desired internal pressure readings.

For both ID purge control and OD purge control it may be desirable to have an increased purge gas flow rate prior to a welding operation in order to minimize or reduce purging time. Also, after a welding operation is completed, it may be desirable to again have an increased purge gas flow rate to reduce purge time, cool the weld and minimize oxidation. For both scenarios, the use of automatic purge control such as with an MFC device, for example, allows for automatic and precise dynamic control and change of the purge gas flow rates, which in prior systems would be time consuming and manually performed, and in many cases not even possible.

With continued reference to FIG. 1, in another embodiment, dynamic flow control may be realized on a more real-time basis, as distinguished from empirically predetermined flow rate versus pressure profiles. Such dynamic flow control may be used for dynamic purge control, especially with respect to ID purge control. As noted herein above, ID purge gas pressure typically varies during a welding operation because venting decreases as the weldment forms. In accordance with another inventive aspect of this disclosure, dynamic purge control may be realized by the use of pressure sensing in combination with automatic flow rate control as described herein above. By dynamic is simply meant that a purge gas flow may be adjusted on a real time or near real time basis in response to a sensed condition, such as for example, pressure at the weld site.

In accordance with this aspect, a pressure transducer 50 or other pressure sensing arrangement may be disposed near the weld site W (such as with a T-connection as noted herein above) so as to sense the ID purge gas pressure prior to a welding operation. The flow rate of various pressures can then be determined, much the same way as using a magnahelic as described above. This transducer 50 is then removed for a welding operation. A second pressure transducer 52 or other pressure sensing arrangement may be disposed along the flow path between the MFC ID 26 and the welder, such as near an outlet of the MFC 26. During a welding operation, the control system 20 monitors the pressure sensor 52 which will detect dynamic pressure changes as the welding operation is performed. The control system 20 in response to these pressure changes can dynamically adjust the flow rate of purge gas from the MFC 26 to maintain a desired ID pressure. In some cases, the pressure sensed at the MFC outlet may not be the same pressure at the weld site W due to pressure drop or flow resistance along the flow path. These variations can easily be determined during calibration while profiling the flow versus pressure characteristics with the first transducer 50, and used as an adjustment factor during a welding operation.

Figure 3:
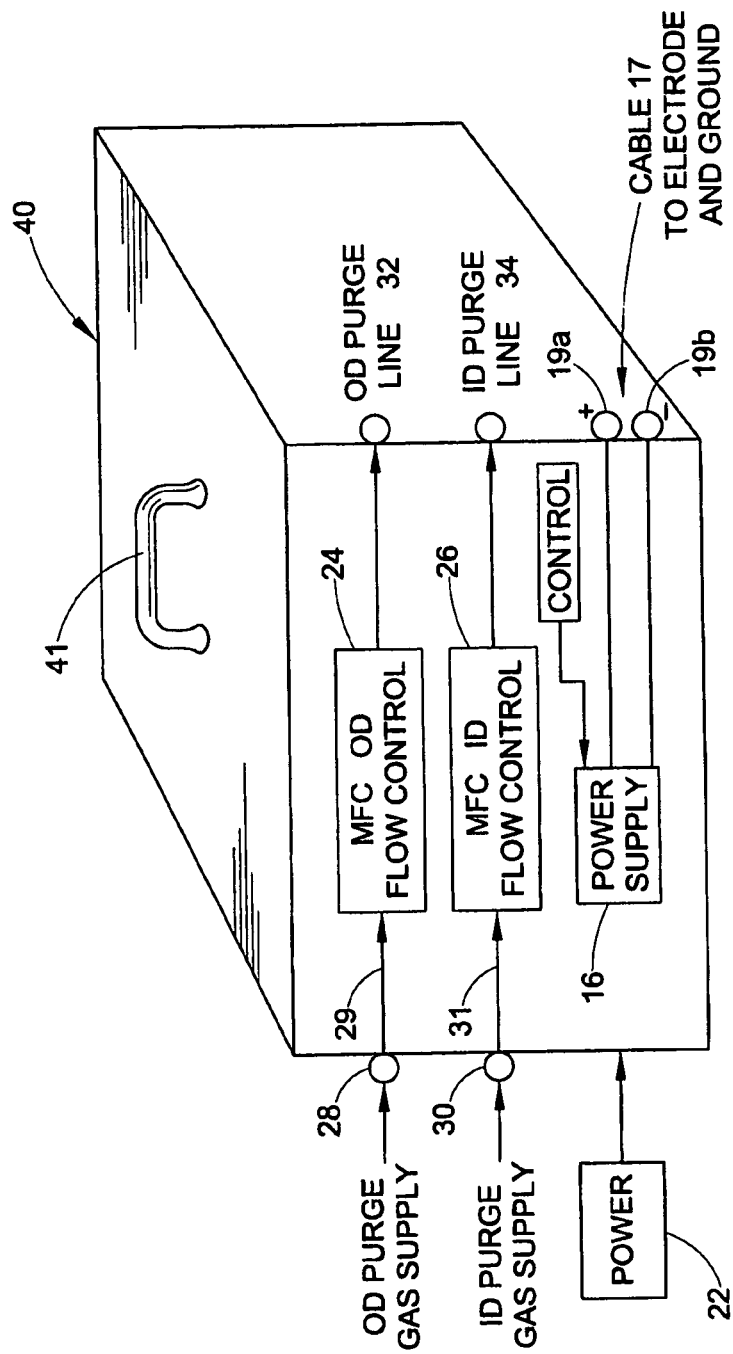
FIG. 3 is a simplified schematic of an embodiment of an orbital welder power supply that includes a purge flow control in a common housing.

With reference to FIG. 3, in accordance with another inventive aspect of the disclosure, the use of automatic purge controls allows for the purge function to be incorporated with the power supply into a single and preferably portable assembly. For example, a housing 40 (which may for example be portable with use of a handle 41 for example) encloses the purge controls 24, 26 as well as the power supply 16 and the control system 20. An operator may simply plug in the supply 16 to an outlet 22, connect gas lines (not shown) between the purge gas connections 28, 30 and purge gas supply tanks (not shown), connect the electrical cable 17 between the power supply output connectors 19a, 19b and the weld head 12, and run the purge lines 32, 34 to the weld head 12. The control system 20 may be programmed to check that there is the correct purge flow to the welder prior to allowing an arc to be struck. This avoids an operator forgetting to connect and purge the system properly prior to welding. In this manner, the system 10 can self-check for proper purging, whereas in prior systems the purge operation was a separate stand alone assembly, with an operator using manual purging operations that are separate and independent from the power system so that purging errors could occur without a disable of the weld system.

Figure 2:
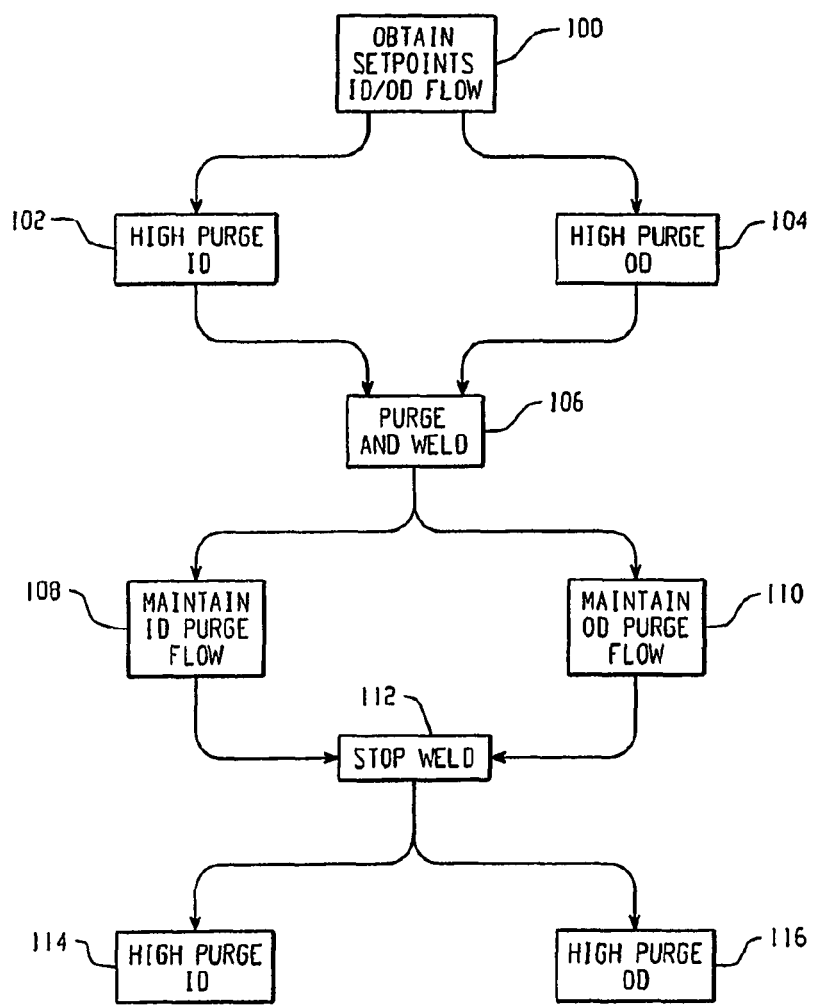
FIG. 2 is an exemplary flow chart of a purge function that may be implemented, for example, in the system of FIG. 1.

FIG. 2 illustrates an exemplary functional flow chart for an exemplary purge operation facilitated by use of the automatic purge controls.

At step 100 the control system 20 obtains either from a memory or a user input the ID and OD purge set points for a selected welding operation. For example, a look up table may be used to store different flow set points for ID and OD purge during different welding operations. At steps 102 and 104, increased purge flow rates may be used as discussed above. At step 106, reduce purge flows are used during a welding operation. These flow rates are controlled at steps 108, 110 by control 20 interfacing with the MFC devices. At step 112 the welding operation is completed. At steps 114 and 116, increased purge flow rates may be used, again as discussed above. Although not illustrated in FIG. 2, the control system 20 may execute a routine to determine that the purge system is functioning properly prior to enabling the weld system to operate.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. Welding system for tubular workpieces, comprising:
a welder power supply, the welder power supply being connectable to an orbital weld head for providing electrical power during a welding operation;
a first automatic flow control for purge gas, said first automatic flow control comprising an inlet connectable to a source of purge gas and an outlet for providing a flow of purge gas to an outer diameter (OD) region of a weld site for tubular workpieces; said first automatic flow control controlling flow rate of purge gas to said outer diameter (OD) region of the weld site during an orbital welding operation;
a second automatic flow control for purge gas, said second automatic flow control comprising an inlet connectable to a source of purge gas and an outlet for providing a flow of purge gas to an inner diameter (ID) region of a weld site for tubular workpieces, said second automatic flow control controlling flow rate of purge gas to said inner diameter (ID) region to maintain a desired ID purge gas pressure during a welding operation;

said second automatic flow control for purge gas comprising an automatic ID purge control, said automatic ID purge control comprising a pressure sensor that detects ID purge gas pressure, said automatic ID purge control adjusting flow rate of purge gas to maintain said desired ID purge gas pressure at the weld site during a welding operation;

said second automatic flow control for purge gas comprises a mass flow controller, said second automatic flow control for purge gas adjusting flow rate of purge gas from said mass flow controller to said ID region based in part on a signal from said pressure sensor during a welding operation.

2. The system of claim 1 comprising a control system that enables operation of said welder power supply only when adequate purge gas flow is present at the weld site.

3. The system of claim 1 comprising an automatic OD purge control that executes a dynamic purge flow rate sequence that includes an increased purge flow rate prior to a welding operation, a reduced purge flow rate during a welding operation, and an increased purge flow rate after a welding operation.

4. The system of claim 1 wherein said first automatic flow control for purge gas comprises a second mass flow controller.

5. The system of claim 1 wherein said welder power supply is inhibited from providing electrical power for a welding operation in the absence of confirmation that purge gas is present at the weld site by sensing flow of purge gas from said automatic flow control outlet to the orbital weld head.

6. The system of claim 1 comprising an orbital welder that is operable with said welder power supply and said first automatic flow control for purge gas and said second automatic flow control for purge gas.

7. The system of claim 1 comprising a control system for adjusting one or both of ID and OD purge gas flow rates to the weld site of tubular workpieces within an orbital welder.

8. A method for controlling purging during a welding operation, comprising:
    performing a butt welding operation on end to end abutting tubular workpieces using an orbital welder,
    applying an electronically stored flow rate profile for purge gas to an outer diameter region at the weld site during a welding operation,
    said electronically stored flow rate profile comprising at least a first flow rate before a welding operation begins, a second flow rate during the welding operation with said second flow rate being lower than said first flow rate, and a third flow rate after the welding operation ends with said third flow rate being higher than said second flow rate.

9. The method of claim 8 wherein said step of applying a flow rate profile includes using an electronic automatic purge control.

10. The method of claim 9 wherein a welding operation is automatically inhibited until purge gas is flowing to the weld site.

11. The method of claim 9 wherein said step of applying a flow rate profile includes using a mass flow controller.

* * * * *